United States Patent [19]

Daigle et al.

[11] Patent Number: 5,044,583
[45] Date of Patent: * Sep. 3, 1991

[54] CONDUIT BRACKET LOCK SYSTEM WITH FLEXIBLE HINGE

[75] Inventors: Robert V. Daigle, Deerfield Beach, Fla.; Gordon J. Grice, Janesville, Wis.

[73] Assignee: Creative Systems Einginnering, Inc., Janesville, Wis.

[ * ] Notice: The portion of the term of this patent subsequent to Mar. 27, 2007 has been disclaimed.

[21] Appl. No.: 480,912

[22] Filed: Feb. 16, 1990

Related U.S. Application Data

[63] Continuation-in-part of Ser. No. 354,806, May 22, 1989, Pat. No. 4,911,387, which is a continuation-in-part of Ser. No. 211,967, Jun. 27, 1988, Pat. No. 4,901,957.

[51] Int. Cl.$^5$ .................................................. F16L 3/00
[52] U.S. Cl. ........................................ 248/62; 248/65; 248/74.4
[58] Field of Search .......................... 248/62, 74.1, 74.2, 248/74.3, 74.4, 74.5, 65, 73, 49, 58, 63, 343; 239/209; 138/107

[56] References Cited

U.S. PATENT DOCUMENTS

| 4,564,163 | 1/1986 | Barnett | 248/74.3 X |
| 4,669,156 | 6/1987 | Guido et al. | 248/74.3 X |
| 4,728,071 | 3/1988 | Salacuse | 248/745 X |
| 4,901,957 | 2/1990 | Daigle et al. | 248/62 |
| 4,911,387 | 3/1990 | Daigle et al. | 248/62 |

FOREIGN PATENT DOCUMENTS 2183287 6/1987 United Kingdom ............... 248/74.1

*Primary Examiner*—Ramon O. Ramirez
*Attorney, Agent, or Firm*—Melvin K. Silverman

[57] ABSTRACT

A modular conduit securement system includes a back bracket having, in transverse cross-section, polygonal back surface proportioned for securement to at least one constructional surface. Such back bracket includes a front surface having resilient nesting elements having a partially opened-face geometry. The back bracket further includes, along each proposed inner transverse edge, first complemental coupling elements. The conduit, proportioned for complemental coupling to the nesting elements of the back bracket, is provided. Further provided is inner front plate proportioned, in transverse cross-section, for complemental engagement with the first complemental coupling elements to thusly provide a modular conduit system formed by the insertion of the conduit into the nesting elements and by the coupling of the front plate over the first coupling element of the back bracket. Otherwise non-functional surfaces of said front plate and the back bracket are integrally connected by a flexible, resilient accordion-like surface.

9 Claims, 2 Drawing Sheets

CONDUIT BRACKET LOCK SYSTEM WITH FLEXIBLE HINGE

REFERENCE TO RELATED APPLICATION

This case is a continuation-in-part of application Ser. No. 07/354,806 filed May 22, 1989, which is itself a continuation-in-part of application Ser. No. 07/211,967, filed June 27, 1988, entitled Modular Conduit System, which are now U.S. Pat. Nos. 4,911,387 and 4,901,957, respectively.

BACKGROUND OF THE INVENTION

The present invention relates to a bracket and lock system for the securement, typically at elevated levels, at or near the level of a ceiling, of selected conduits including, without limitation, electrical and fluid conduits.

In the prior art, the securement of pipes in residential, commercial, and industrial environments has been a time consuming, tedious, and expensive undertaking. Further, the process of servicing such conduits, once installed, has also proven to be difficult, expensive, and time consuming.

There exists, in the prior art, various types of brackets having utility in the securement of one or another type of conduit. Such art, as is best known to the inventor, is reflected in U.S. Pat. No. 2,625,354 (1953) to Smith, entitled Pipe Supporting and Anchoring means; U.S. Pat. No. 3,295,805 (1967) to Modeme, entitled Two Part Clip for Attaching a Cylindrical Member to a Support; U.S. Pat. No. 4,079,786 (1978) to Moling, entitled Fire Extinguishing System; and U.S. Pat. No. 4,252,289 (1981) to Herb, entitled Two Part Pipe Clip. Relevant foreign prior art known to the Applicants consist of Swiss Patent No. 306,165 (1955) to Picart, entitled Bracket for the Fixation of Cables.

None of the above, nor other prior art known to the Inventors, discloses a modular conduit system in which the conduit may be nested within a bracket structure for the selective decoupling therefrom and which, further provides for the selective inclusion of insulation about the conduit shielded within a self-contained modular protective heat shield as an exterior plate. Prior art modular conduit systems do not enjoy the structural integrity, or the option of employing insulation, or the ease of installation, as is provided by the structure and system herein. Accordingly, components and systems that exist in the prior art are not practically functional as a heat shield as is the case in the system set forth herein.

The instant invention is formed completely of components which may be selectably coupled, as by snap fitting, together to form common connections between all components, thereof, thereby alleviating the need for much of the laborious aspects associated with installation of conduits and piping as has been known in the prior art.

It is in response to the above described limitations in the prior art that the present invention is directed.

Further, the instant invention constitutes a direct improvement of our co-pending Applications referenced above.

SUMMARY OF THE INVENTION

The instant invention relates to a modular system for the securement of a conduit to at least one constructional surface. The inventive modular system includes a back bracket having, in transverse cross-section, a partial polygonal back surface having a plurality of faces, each face thereof proportioned for securement to at least one constructional surface, said bracket having front surfaces defining resilient nesting means having a partially open-face geometry, said back plate further comprising, along each opposite inner transverse edge thereof, first complemental coupling means. The invention also including a conduit proportioned for complemental coupling to said nesting means of said back plate, front plate proportioned, in transverse cross-section, for complemental engagement with said first complemental coupling means; and a flexible hinge in integral communication with a radial surface of said inner front plate opposite to that surface proportioned for said complemental engagement with said first complemental coupling means said flexible hinge further integral with a surface of said rear bracket radially opposite to that surface defining said resilient nesting means. Said flexible hinge operates to connect an otherwise non-functional surface of said inner front plate to an otherwise non-functional surface of said back bracket to maintain said front plate in a relationship to said back bracket, prior to said complemental engagement of said front plate to said first complemental coupling means of said back bracket, without need for a user of the system to independently hold or secure said front plate prior to its complemental engagement with said back bracket.

It is accordingly an object of the present invention to provide an improved conduit bracket lock system.

It is a further object of the present invention to provide a conduit bracket lock system having an integral hinge by which the cover potion thereof is at all times connected to a back bracket portion thereof.

It is a further object of the present invention to provide an improved conduit bracket lock system having particular utility and convenience in the suspension of electrical and fluid conduits at or near the line of intersection between walls and ceilings of residential, commercial, and industrial structures.

It is another object of the present invention to provide a conduit bracket lock system particularly adapted for ease of installation and servicing of the secured conduit.

The above and yet other objects and advantages will become apparent in the hereinafter set forth Detailed Description of the Invention, The Drawings, and Claims appended herewith.

DETAILED DESCRIPTION OF THE INVENTION

Figure 1:
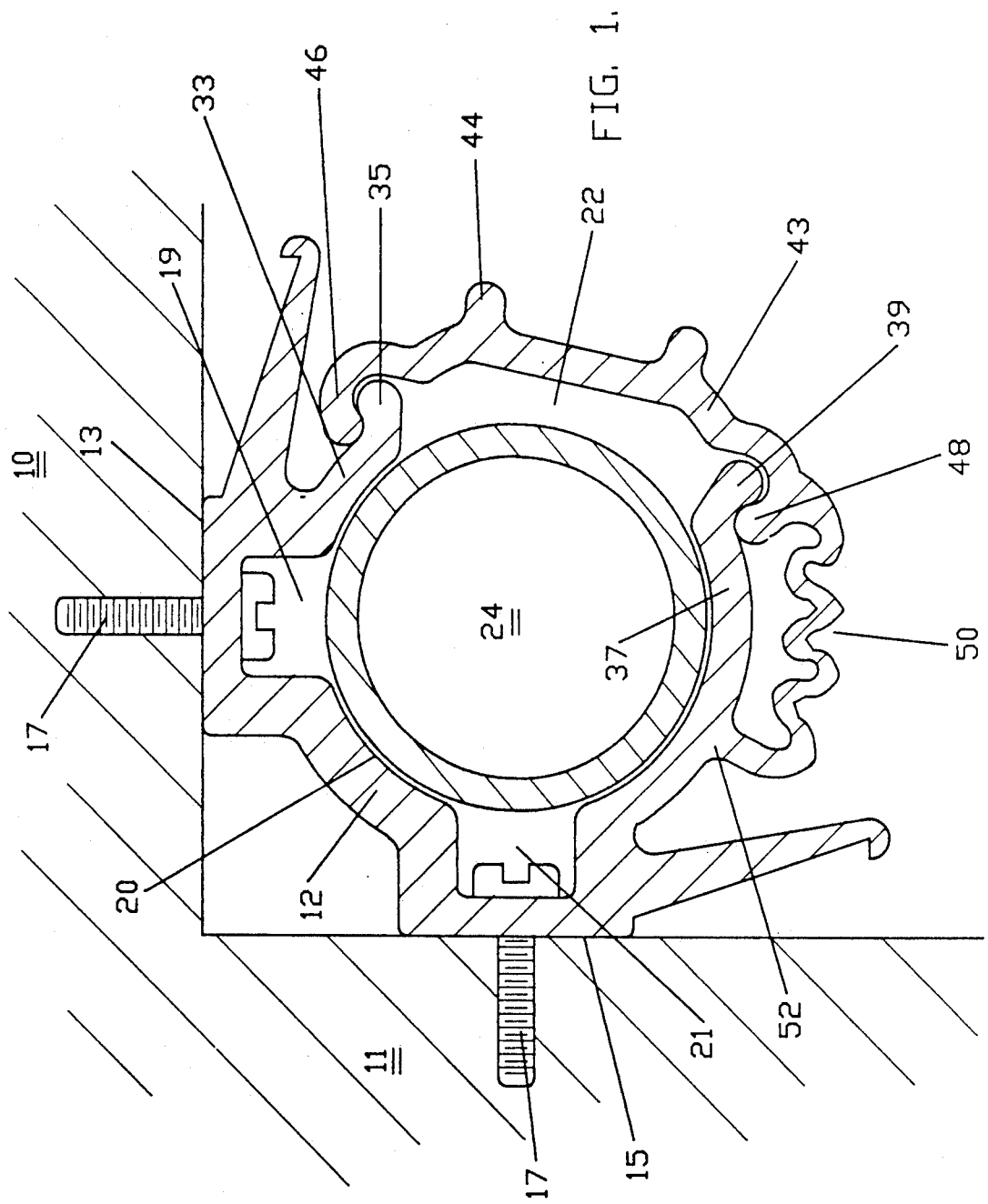
FIG. 1 is a radial cross-sectional operational view of the inventive conduit bracket lock system.
Figure 3:
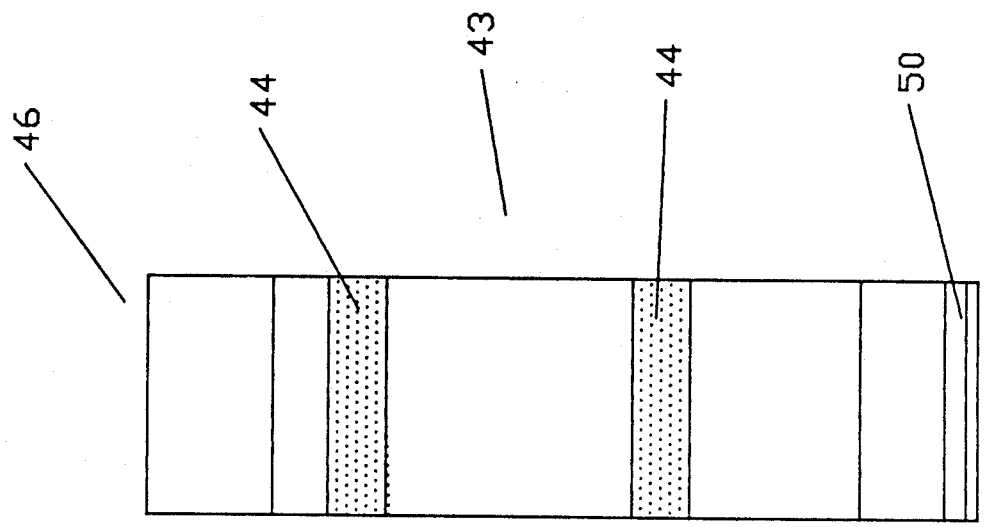
FIG. 3 is a side plane view of FIG. 2.
Figure 2:
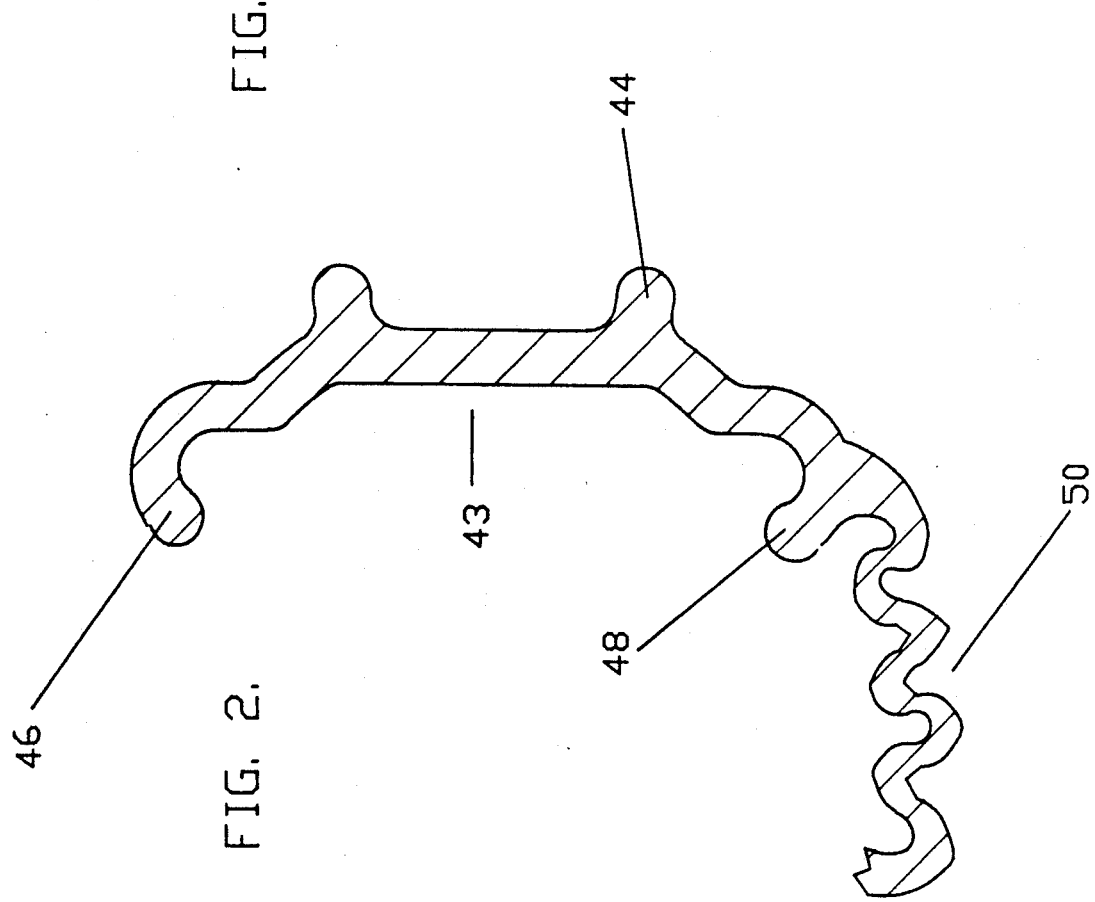
FIG. 2 is a radial fragmentary view of the front plate portion of the inventive system.

With reference to the views of FIGS. 1 thru 3, the modular conduit system is seen to include a back bracket 12 having a plurality of polygonal surfaces 13 and 15. In the view of FIG. 1, said surface 13 is secured to a ceiling 10 though the use of screw means 17. As may be noted, each of said surfaces 13 and 15 are proportioned for securement to at least one constructional surface 10 or 11. Accordingly, it is to be appreciated while, in the view of FIG. 1, the bracket is shown secured to both ceiling 10 and wall 11, in other applications bracket 12 may be secured to either ceiling 10 or wall 11, but not both.

Upon the radial inner side 20 of said bracket 12 are provided a plurality of inner radial recesses 19 and 21 which correspond respectively to said polygonal faces 13 and 15. One of the important functions of such recesses is to provide radial flexibility to the back bracket 12 to assist in the below described coupling functions.

With further reference to FIG. 1, it is noted that said back plate 12 further includes upper and lower first complemental coupling means 35 and 39 respectively which are disposed along opposing sides of open jaw 22 of said back bracket 20. More particularly, the upper first complemental coupling means 35 depends from an arm 33 of the back plate 12, while the lower first complemental means 39 depends from an arm 37 including surface 20 of back bracket 12.

Also shown in the view of FIG. 1 is a conduit 24 that may be snapped-fittably, i.e., complementally, coupled within back bracket 12 by pressing conduit 24 thru open jaw 22 between said first complemental coupling means 35 and 39 so that the conduit 24 will abut against surface 20 and the entrance to recesses 19 and 21.

The instant inventive system further includes a snap-on inner front plate 43 shown in radial cross-section in FIGS. 1 and 2. Said front plate 43 is proportioned for complemental engagement with said first complemental coupling means 35 and 39 of back bracket 12. Front plate 43 is provided with nobs 44 which are useful in the gripping of plate 43 to press gripping elements 46 and 48 against said complemental coupling means 35 and 39.

With further reference to FIGS. 1 and 2, there is shown a flexible hinge 50 which is in integral communication with the general region of plate 44 associated with gripping element 48. Further, flexible hinge 50 is in integral communication with bracket 12 in the region of lower area 52 thereof.

It is to be noted that flexible hinge 50 generally defines an axis which is substantially parallel to the lower surface of back bracket 12 in the area of region 37.

It is to be further noted that hinge 50 defines a resilient corrugated surface which is generally accordion or spring-like in character.

The basic function of flexible hinge 50 is to render more convenient to the installer of the instant system the act of attaching plate 43 to bracket 12. In other words, the presence of flexible hinge 50 renders unnecessary the separate holding or securement of plate 43 relative to back bracket 12. As such, a substantial savings in time and effort as well as enhanced safety to the installer is accomplished.

Accordingly, while there has been shown and described the preferred embodiment of the present invention, it is to be appreciated that the invention may be embodied otherwise than is herein specifically shown and described and that, within said embodiment, certain changes may be made within the detail and construction thereof without departing from the underlying idea or principles of the present invention within the scope of the claims appended herewith.

Having thus described our invention, what we claim as new, useful and non-obvious and, accordingly, secure by Letters Patent of the United States is:

1. A modular system for the securement of a conduit to at least one constructional surface, the system comprising:
    (a) a back bracket having, in transverse cross-section, a partial polygonal back surface having a plurality of faces, each face thereof proportioned for securement to at least one constructional surface, said bracket having front surface defining resilient nesting means having a partially opened-face geometry said nesting means proportioned to the geometry of said conduit, said back plate further comprising, along each opposite inner transverse edge thereof, complemental coupling means;
    (b) a front plate proportioned, in transverse cross-section, for complemental engagement with said complemental coupling means; and
    (c) flexible hinge means in integral communication with that surface of said front plate positioned opposite to said back bracket said hinge further integral with a surface of said back bracket not coupled to said conduit,
whereby a modular conduit system may be formed by inserting said conduit into said nesting means and by coupling said front plate to said complemental coupling means of said back bracket.

2. The system as recited in claim 1, in which said flexible hinge defines an axis, said axis substantially parallel to said rear bracket surface.

3. The system as recited in claim 1, in which said flexible hinge defines a resilient corrugated surface.

4. The system as recited in claim 2, in which said flexible hinge means defines a resilient corrugated surface.

5. The system as recited in claim 3, in which said corrugated surface defines a spring-like accordion surface.

6. The system as recited in claim 4, in which said corrugated surface defines a spring-like accordion type surface.

7. The system as recited in claim 5, in which said back bracket further comprises:
    second complemental coupling means along each opposite outer transverse edge thereof.

8. The system as recited in claim 2 in which said back bracket further comprises:
    second complemental coupling means along each opposite outer transverse edge thereof.

9. The system as recited in claim 7 in which said system further comprises:
    an outer front plate proportioned, in transverse cross-section, for complemental engagement with said second complemental coupling means,
    whereby a modular pipe system having insulation of protective materials within said outer front plant and exterior to said conduit may be formed.

* * * * *